Dec. 29, 1942.  L. D. CAHILL ET AL  2,306,935

STORAGE BATTERY

Filed Dec. 28, 1940  2 Sheets-Sheet 1

INVENTORS
LYSLE D. CAHILL
FORREST A. FRAMPTON
ROBERT M. RANEY
BY Kwis Hudson & Kent
ATTORNEYS Dec. 29, 1942.  L. D. CAHILL ET AL  2,306,935
STORAGE BATTERY
Filed Dec. 28, 1940  2 Sheets-Sheet 2

INVENTORS
LYSLE D. CAHILL
FORREST A. FRAMPTON
ROBERT M. RANEY
BY Kwis Hudson & Kent
ATTORNEYS Patented Dec. 29, 1942

2,306,935

UNITED STATES PATENT OFFICE 2,306,935

STORAGE BATTERY

Lysle D. Cahill, East Cleveland, Forrest A. Frampton, Cleveland, and Robert M. Raney, Euclid, Ohio, assignors to Willard Storage Battery Company, Cleveland, Ohio, a corporation of West Virginia Application December 28, 1940, Serial No. 372,104

3 Claims. (Cl. 136—6)

This invention relates to storage batteries, and as its principal object aims to provide an improved storage battery of such simplicity and compactness as to adapt the same particularly for use where limitation of the size and weight of the battery is of prime importance.

Another object of our invention is to provide an improved storage battery having a plurality of cells and in which a body of plastic material solidified in place on the container forms a unitary cover extending over all of the cells.

Still another object of our invention is to provide an improved storage battery of compact form in which the electrolyte is carried by absorbent material located between the battery plates and the container has permanently open vents through which water or electrolyte may be supplied to such absorbent material.

Our invention may be further briefly summarized as consisting in certain novel combinations and arrangements of parts hereinafter described and particularly set out in the appended claims.

In the accompanying sheets of drawings.

In the accompanying drawings, to which more detailed reference will now be made, we have shown our invention embodied in small size, compact storage batteries adapted to be embodied in radios or other meteorological apparatus designed to be carried aloft by balloons, but it will be understood, of course, that the invention is not limited to the specific forms of batteries here shown, nor to batteries for meteorological use, but is applicable to storage batteries having various other forms and uses.

Figure 1:
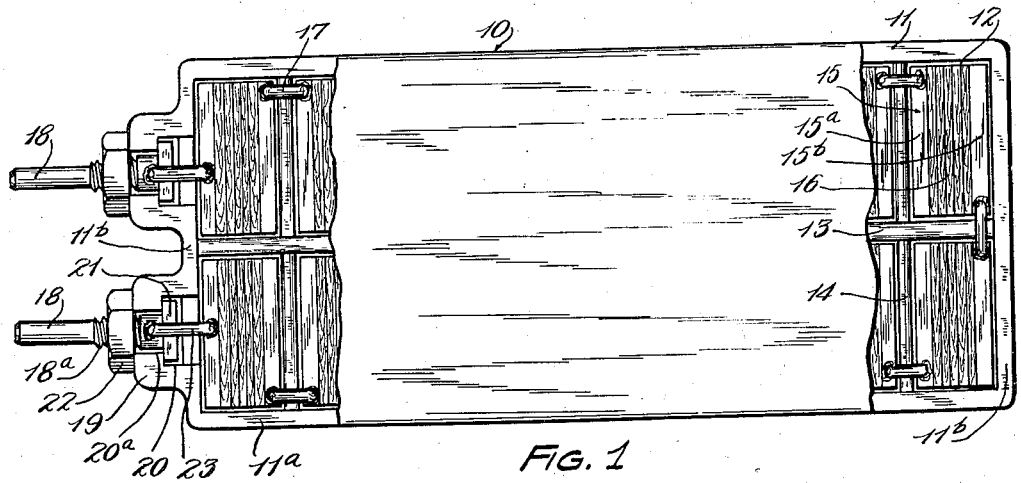
Fig. 1 is a top plan view, with portions broken away, showing a storage battery of our improved construction.
Figure 2:
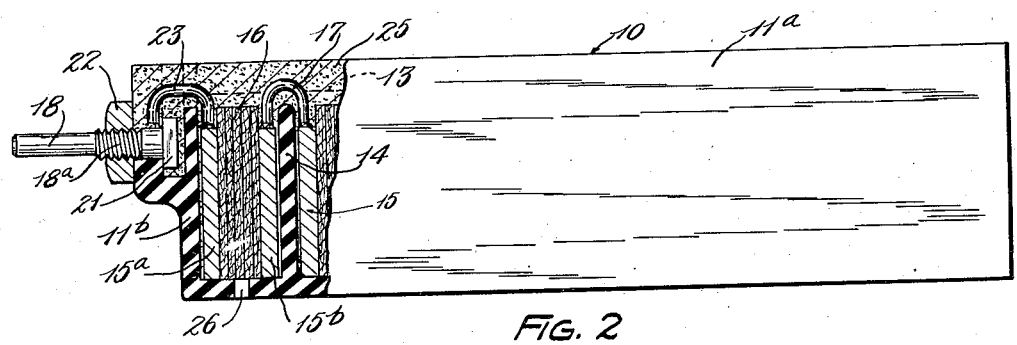
Fig. 2 is a side view of the battery with portions thereof shown in section.
Figure 3:
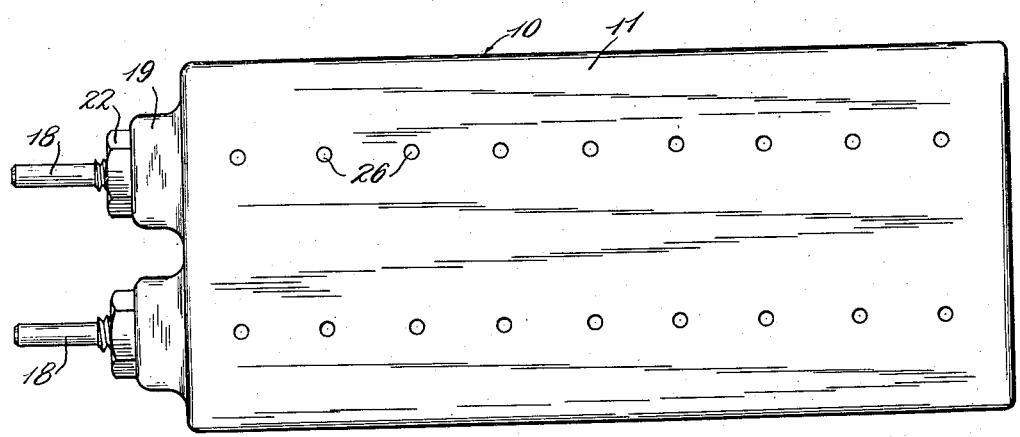
Fig. 3 is a bottom plan view of the battery.

In Figs. 1, 2 and 3 we show our invention embodied in a storage battery 10, which is of a simplified and compact construction suitable for meteorological and other uses. The battery here shown may be used as a radio "B" battery, which is a battery of relatively high voltage, and comprises a battery container 11 having a relatively large number of cells or compartments 12 therein. The container 11 may be molded from suitable thermoplastic insulating material and may have intersecting longitudinal and transverse partitions 13 and 14 therein which divide the interior of the container into the compartments or cells 12. The partition walls 13 and 14 are preferably somewhat lower in height than the side and end walls 11a and 11b of the container, as indicated in Fig. 2 of the drawings, and the transverse partition walls 14 may be somewhat lower than the longitudinal wall 13.

Each of the cells 12 contains a plurality of spaced battery plates 15a and 15b. These plates may be of the same general type of construction as is usually employed in storage batteries, that is to say, each plate may comprise a grid formed of lead or lead alloy and active material applied to the grid as in the form of a paste. As shown in Figs. 1 and 2, each cell contains two such plates, one positive and one negative, and which plates may be located adjacent the side walls of the cell. The electrolyte for the plates may be carried by a body or quantity of absorbent material 16 located in the cells between the plates 15 therein. Such absorbent material or separators may be of any suitable fibrous, porous or sponge-like substance which will serve to hold or carry a quantity of electrolyte sufficient for the proper electrolytic action. The absorbent material may, as shown in this instance, be in strata or layers or, if preferred, may be left in a single bundle or body. As shown in Fig. 2 the absorbent material preferably extends somewhat above the tops of the battery plates 15.

The cells 12 of the battery 10 may be electrically connected with each other by means of inter-cell connectors 17 which extend across the partition walls 13 and 14. These inter-cell connectors may comprise pieces of wire which are bent or looped to extend over the tops of the partition walls and have their ends soldered or otherwise connected to the battery plates lying adjacent such partition walls. For a purpose to be presently explained, these inter-cell connectors are preferably formed so that the top portions of the connectors will be spaced above the tops of the partition walls over which they extend.

The battery may be provided with a pair of terminal posts 18 which, in this instance, are mounted on an end wall 11b of the battery container. The wall on which the terminal posts are mounted is provided with a thickened portion or portions 19 in which T-slots 20 are formed so as to lie outward of the cell compartments of the container. The terminal posts 18 may have heads 21 of non-circular form, preferably square, which are non-rotatably received in the T-slots 20. The terminal posts may be arranged to project laterally from the T-slots and may have threaded portions 18a extending outwardly through the reduced portions 20a of the slots. Clamping nuts 22 engaging such threaded portions 18a cooperate with the heads 21 in gripping the battery container. Conductors 23, of a form generally similar to the conductors 17, extend over portions of the end wall 11b for connecting the terminal posts 18 with the end plates of the adjacent battery cells.

The top wall or cover 25 of the battery 10 comprises a body of sealing material solidified in place on the battery container and may be formed of any material suitable for this purpose such as a thermoplastic or thermosetting material. This body of sealing material extends over substantially the entire top of the battery container and forms a unitary cover which closes and effectively seals the tops of all of the cells 12 and also extends over the thickened wall portions 19 on which the terminal posts 18 are mounted. The material for forming the cover 25 is applied to the top of the battery container and the tops of the elements in the cells 12 in a soft or plastic condition so that it will flow around and under the conductors 17 and 23 as well as into the T-slots 20 and other existing recesses or depressions. When the material is caused to flow around and under the conductors 17 and 23 it forms a tight seal around these conductors which effectively prevents electrolyte from leaking or creeping along these conductors and causing short-circuits. By forming the cover 25 from solidified plastic material it is unnecessary to construct and handle separate covers for the cells and, moreover, the solidification of the plastic material around the inter-cell conductors and in contact with the absorbent material 16 causes the unitary cover 25 to be firmly connected with the top of the battery.

For vent and drainage purposes we may provide the container 11 with a plurality of openings or passages 26 directly connecting the cell compartments with atmosphere. The openings 26 are preferably formed in the bottom of the container substantially opposite the absorbent material 16. In addition to serving as vent and drainage openings these openings may be used for supplying electrolyte or water to the absorbent material 16 of the cells. This may be accomplished by inserting a nozzle or other hollow instrument through these openings and feeding the liquid to the absorbent material.

Figure 4:
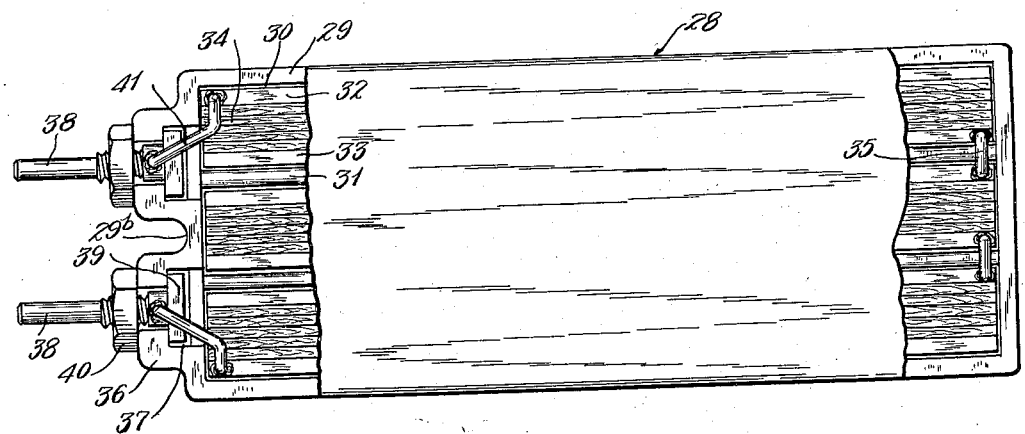
Fig. 4 is a top plan view, with portions broken away, showing another battery embodying our improved construction.
Figure 5:
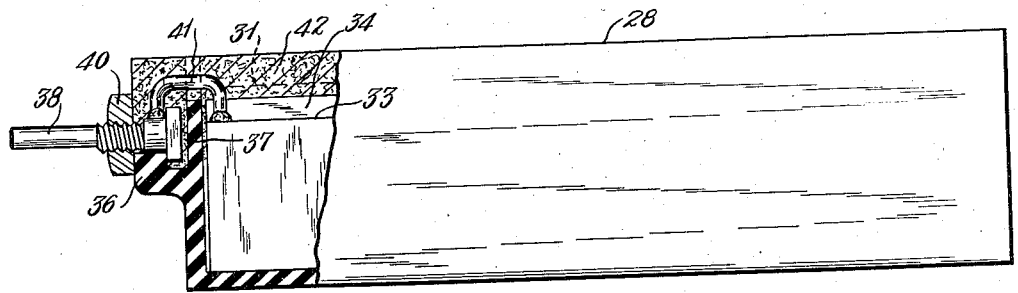
Fig. 5 is a side elevation thereof, with portions of the battery shown in section.
Figure 6:
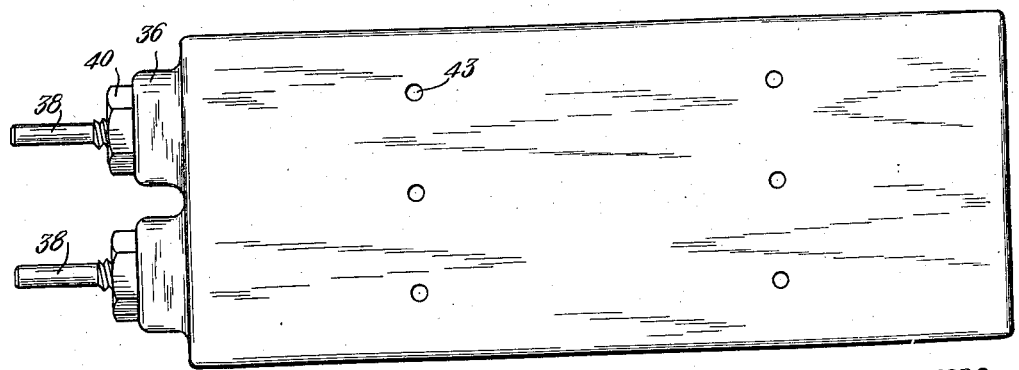
Fig. 6 is a bottom plan view of the battery.

In Figs. 4, 5 and 6 we show our improved construction embodied in a storage battery 28 having characteristics similar to those of the battery 10. The battery 28, however, is intended for use as a radio "A" battery, or in other words a battery of relatively large current capacity, and hence the casing or container 29 thereof contains only three cells or compartments 30. The container 29 may be of a size and shape similar to the container 11, but having only the two longitudinal partition walls 31 dividing the interior of the container into the three cells or compartments 30.

Each of the longitudinally extending cells 30 contains a pair of spaced positive and negative battery plates 32 and 33 and a body or quantity of absorbent material 34 disposed between the plates and carrying a quantity of electrolyte. The cells are electrically connected with each other by inter-cell connectors 35 which may comprise wire loops extending across the partition walls 31, preferably over the tops thereof, and having their ends soldered or otherwise connected to the battery plates of adjacent cells. The end wall 29b of the battery container may have lugs or thickened portions 36 provided with T-slots 37 in which terminal posts 38 may be mounted. These terminal posts have square heads 39 non-rotatably engaging in the T-slots and nuts 40 for clamping cooperation with such heads. Conductors 41 may be arranged to connect the outermost plates of the end cells with the terminal posts 38.

The cover 42 is similar to the cover 25 and comprises a body of sealing material solidified in place on the container and extending over the entire top thereof to close and seal the compartments 30 and also extending around and under the connectors 35 and 41 to prevent leakage of electrolyte therealong. The material forming the cover may be a thermoplastic or thermosetting material or any other suitable material of this character.

Vent and drainage openings 43 formed in a wall of the container, preferably its bottom wall, connect compartments 30 with atmosphere and also permit water or electrolyte to be supplied to the absorbent material 34.

From the foregoing description and the accompanying drawings it will now be readily understood that we have provided an improved construction whereby storage batteries can be made of very compact form and light weight. Our improved construction provides an efficient storage battery which can be embodied in meteorological radio apparatus or applied to other uses where size and weight are factors of prime importance. It will also be seen that our construction also provides a battery which can be stored dry for an indefinite period and then can be quickly and easily supplied with water or electrolyte.

While we have illustrated and described our improved battery construction in a more or less detailed manner, it will be understood, of course, that we do not wish to be limited to the particular arrangements and details of construction herein disclosed, but regard our invention as including such changes and modifications as do not constitute a departure from the spirit of the invention and the scope of the appended claims.

Having thus described our invention, we claim:

1. A storage battery comprising a battery container having partitions dividing the interior thereof into cell compartments, battery plates in said compartments, conductors extending over the tops of said partitions and connecting the plates of adjacent cells, absorbent material in the spaces between the plates adapted to carry electrolyte, said container having T-slots formed in a wall thereof and also having openings through the bottom thereof connecting said compartments with atmosphere for venting the compartments and for supplying water or electrolyte to said absorbent material said openings being located opposite the absorbent material, terminal posts projecting from said slots and having heads non-rotatably engaging therein, conductors connecting said terminal posts with the battery plates, and a body of material forming a single imperforate cover which extends across and seals the tops of all the compartments said material engaging the tops of the plates and absorbent material, said body of material being solidified in place on the container and having portions of said conductors and of said terminal posts embedded therein.

2. In a storage battery, a container having walls defining therein a plurality of cell compartments and including partition walls between adjacent cells, a pair of spaced battery plates in each compartment and lying close to the opposite side walls thereof, a body of absorbent material in each cell and substantially filling the space between the pair of plates therein, wire loops extending over said partition walls and connecting a plate of one cell with a plate of an adjacent cell, said container having openings in the bottom wall thereof located opposite the bodies of absorbent material for supplying liquid thereto and through which excess liquid may drain from such bodies, and a body of material forming a single imperforate cover which extends across and seals the tops of all the cells, the last-mentioned body of material being solidified in place on the container and having said wire loops embedded therein.

3. A storage battery of relatively small size comprising a container having partitions therein dividing the interior into cell compartments, spaced battery plates in said compartments, absorbent material in the spaces between said plates adapted to carry electrolyte, and wire loops extending over said partitions and connecting a plate of one cell with a plate of an adjacent cell, said container having a single cover thereon formed of a body of plastic material solidified in place on the container in contact with the tops of the plates and absorbent material and which extends across and seals the tops of all the cell compartments and in which said wire loops are embedded so that the top of the loops lie below the upper surface of the solidified material, the container having a plurality of openings leading directly from atmosphere to the respective cell compartments and located opposite the absorbent material for venting the compartments and supplying liquid to said absorbent material, said container having slots formed in a wall thereof, terminal posts projecting from said slots and having heads on the inner sides thereof, and conductors connecting said terminal posts with the battery plates, said body of plastic material having portions of said conductors and of said terminal posts embedded therein.

LYSLE D. CAHILL.
FORREST A. FRAMPTON.
ROBERT M. RANEY.